United States Patent [19]

Kato

[11] 4,060,665

[45] Nov. 29, 1977

[54] ORNAMENTAL ASSEMBLY

[76] Inventor: Chizuo Kato, No. 25-12, 2-chome,, Higashi-Ohi, Shinagawa, Tokyo, Japan

[21] Appl. No.: 737,568

[22] Filed: Nov. 1, 1976

[30] Foreign Application Priority Data

Aug. 16, 1976 Japan .......................... 51-109535[U]

[51] Int. Cl.[2] ............................................. B32B 9/04

[52] U.S. Cl. ....................................... 428/542; 428/24

[58] Field of Search ..................... 428/7, 8, 12, 19, 20, 428/23, 24, 36, 156, 157, 64, 65, 66, 542

[56] References Cited

U.S. PATENT DOCUMENTS

| | | | |
|---|---|---|---|
| 24,569 | 6/1859 | McBurney | 428/65 |
| 355,655 | 1/1887 | Munson | 428/28 |
| 3,386,590 | 6/1968 | Gretz | 428/24 |
| 3,452,476 | 7/1969 | Kise | 428/24 |

*Primary Examiner*—William J. Van Balen
*Attorney, Agent, or Firm*—Scrivener, Parker, Scrivener & Clarke

[57] ABSTRACT

Disclosed is an ornamental assembly which is securely fastened to a member to be decorated with a bush-like insert having an opening adapted to be snugly fitted over the member to be decorated, the insert being in turn snugly fitted into a groove of a holder formed integral with ornamental members.

2 Claims, 8 Drawing Figures

ORNAMENTAL ASSEMBLY

DETAILED DESCRIPTION OF THE INVENTION

The present invention relates to an ornamental assembly which may be readily fastened securely to a member to be decorated such as a pole with any cross-sectional configuration.

For indoor and outdoor decorations, ornamental or decorative objects have been frequently attached to pillars, poles or the like with screws, bolts or the like. Alternatively, they are formed with mortice-like openings to be fitted over the pillars, poles or the like. Therefore there has been an inherent problem that they cannot be readily fastened to the pillars, posts or the like when the cross sectional configurations or outer dimensions of the latter are different from one another.

The present invention was therefore made to overcome the above problem, and will become apparent from the following description of one preferred embodiment thereof taken in conjunction with the accompanying drawings, in which.

Figure 1:
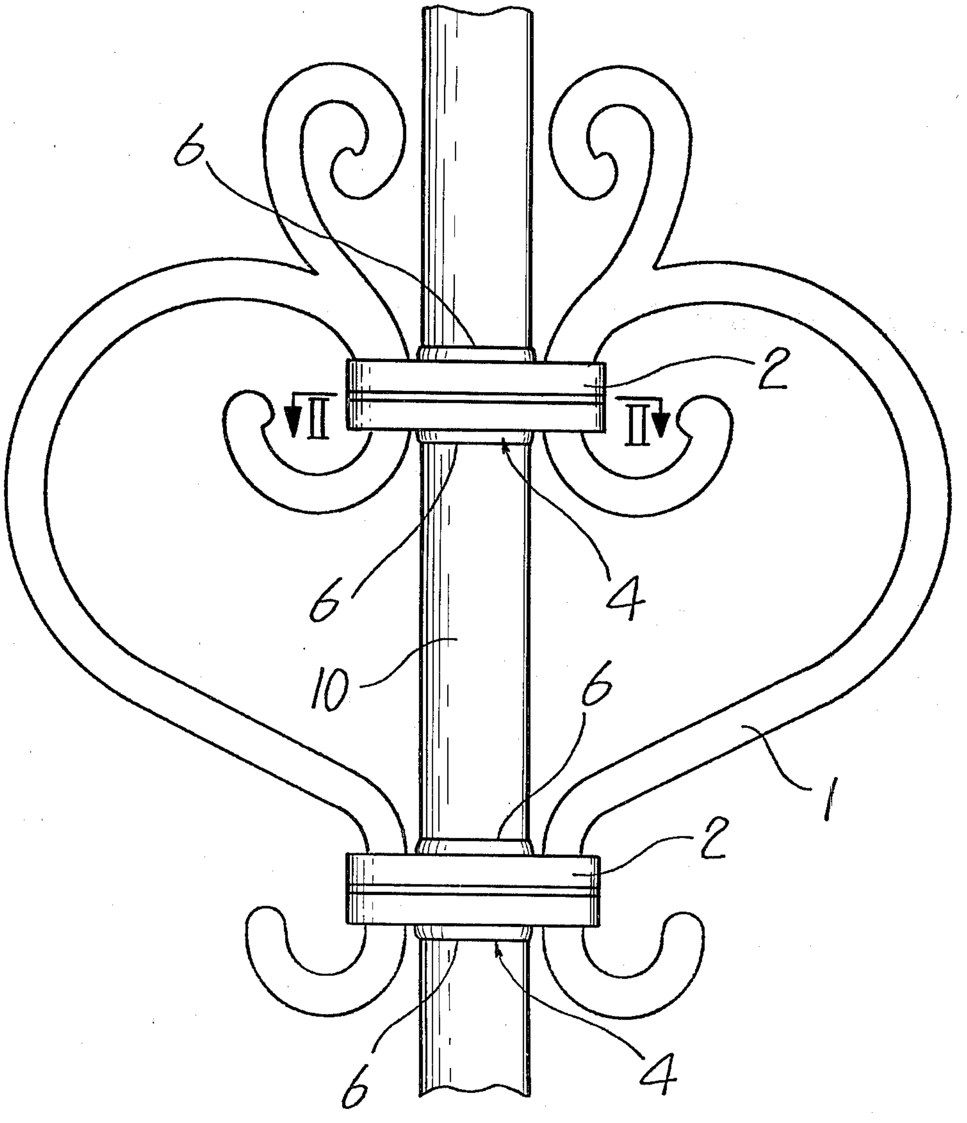
FIG. 1 is a front view of one preferred embodiment of the present invention.
Figure 2:
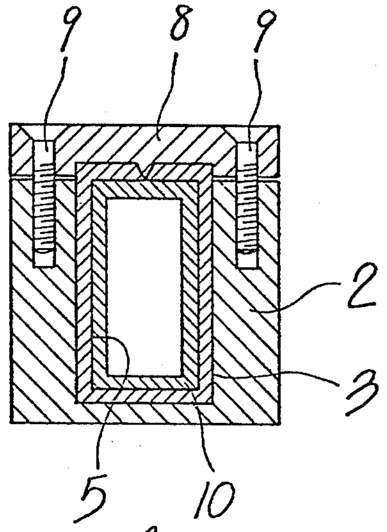
FIG. 2 is a sectional view thereof taken along the line II—II of FIG. 1.
Figure 3:
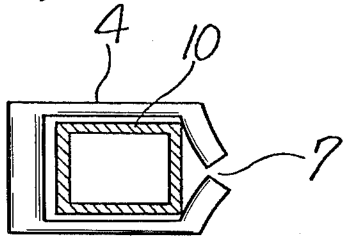
FIGS. 3 and 4 are views used for the explanation of the assembly.
Figure 4:
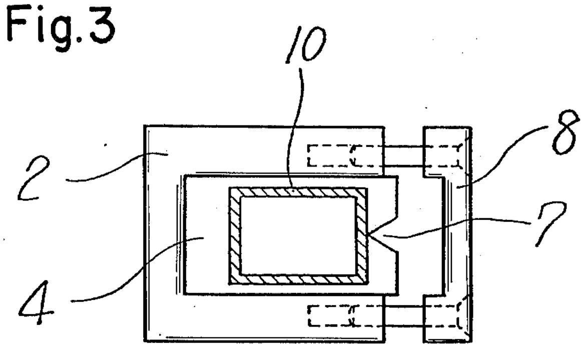
Figure 5:
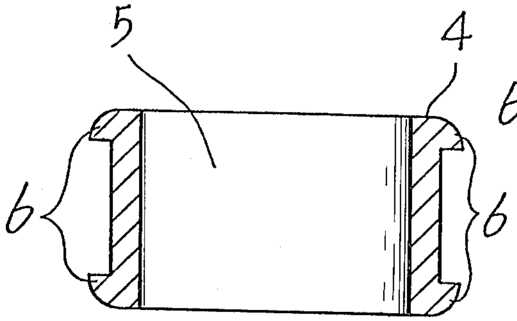
FIG. 5 is a longitudinal sectional view of an insert used in the present invention.
Figure 6:
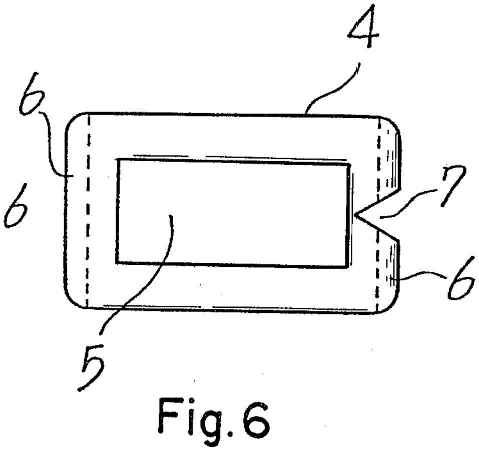
FIG. 6 is a top view thereof.

As shown in FIG. 1, ornamental members 1 are formed, by for instance die casting, integral with holders 2 which are similar in construction and have a U-shaped cross sectional configuration. The channel or groove 3 of the holder 2 is opened at one side wall of the holder 2 as best shown in FIGS. 2 and 4 for releasably receiving therein an insert 4 as shown in FIGS. 5 or 6. The groove 3 has a cross-sectional area greater than the maximum cross-sectional area of a member 10 to which is attached the ornament and which will be referred to as "a post" in this specification for the sake of explanation.

Referring to FIGS. 5 through 8, the insert 4 has the outer dimensions or cross-sectional configuration so that it may be snugly fitted into the groove 3 of the holder 2, has a length slightly greater than the length of the holder 2 and has its both ends terminated into upper and lower flanges 6 for engagement with the upper and lower surfaces of the holder 2 as best shown in FIG. 1. The insert 4 has an axial opening 5 whose dimensions or cross-sectional configuration are such that the insert 4 may be snugly fitted over the post 10 as shown in FIGS. 2 and 4. A V-shaped groove 7 is cut through along the center line of one side wall of the insert 4 which is extended slightly out of the groove 3 of the holder 2.

After the insert 4 is fitted into the holder 2, the opened side of the holder 2 is covered with a cover 8 which has a recess formed on the inner surface for receiving therein the side wall of the insert 4 extended out of the groove 3 of the holder 2. The cover 8 may be releasably joined to the holder 2 with screws or bolts 9 as best shown in FIG. 2.

Figure 7:
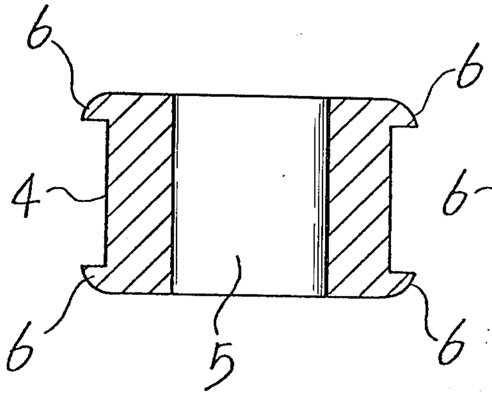
FIG. 7 is a longitudinal sectional view illustrating another example of the insert.

Next the method for fastening the ornament to the post with the fastening device of the present invention will be described. First the insert 4 is removed out of the holder 2, and is extended or expanded outwardly along the V-shaped groove 7 as shown in FIG. 7 so that the insert 4 may be snugly fitted over the post 10. Thereafter the groove 3 of the holder is fitted over the insert 4, and then as shown in FIG. 4 the cover 8 is joined to the opened side of the holder 2 with screws or bolts 9. Thus the ornament can be securely fastened to the post 10. Since the length of the insert 4 is slightly longer than the length of the holder 2 and one side wall with the V-shaped groove 7 of the insert 4 is slightly extended out of the groove 3 of the holder 2, the insert 4 is firmly pressed against the post 10 when the cover 8 is tightly joined to the holder 2, whereby the ornament can be securely fastened to the post 10. Furthermore the flanges 6 of the insert 4 engage with the upper and lower surfaces of the holder 2 for securing more rigid attachment.

Figure 8:
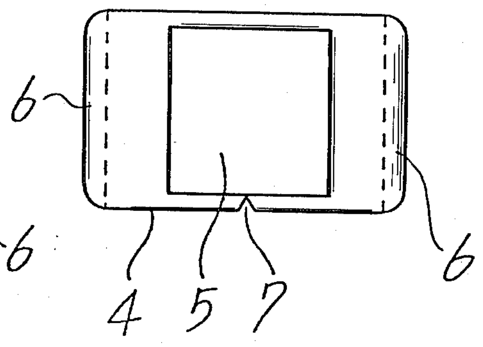
FIG. 8 is a top view thereof.

The opening 5 of the insert 4 may have any cross-sectional configurations dependent upon the cross-sectional configuration of the post 10. For instance, as shown in FIGS. 7 and 8, the insert 4 may have a square opening 5, but the insert 4 has the cross-sectional configuration same with that of the insert 4 shown in FIG. 4. Therefore when the inserts 4 having the openings 5 in various configurations are prepared, a suitable insert may be selected depending upon the cross sectional configuration of the post 10 so that the ornament may be attached to any posts 10 with any cross-sectional configuration.

Since the present invention provides, as described above, the inserts 4 which have the cross-sectional configuration adapted to be snugly fitted into the groove 3 of the holder 2 and the opening having the cross-sectional configuration adapted to be snugly fitted over the member to which the ornament is attached, the following advantages may be obtained:

The ornaments may be easily attached to any members to be decorated without the modification of the holders because the inserts with the opening having the cross-sectional configuration for permitting the snug fitting of the insert over the member to be decorated are releasably fitted into the holders.

The engagement of the flanges of the inserts with the upper and lower surfaces of the holder ensures the secure attachment of the ornament to the member to be decorated.

What is claimed is:

1. An ornamental assembly comprising
   - a. a holder or holders each formed with an axial, insert-receiving groove which is opened at one side of said holder,
   - b. ornamental members formed integral with said holder or holders,
   - c. an insert having a cross-sectional configuration so that the insert may be snugly fitted into said groove of said holder and an opening having a cross-sectional configuration adapted to be snugly fitted over a member to be decorated,
   - a V-shaped groove being cut through one side of said insert along the axial center line thereof, and
   - d. a cover adapted to be releasably joined to said holder for covering the opened side thereof, whereby the ornamental assembly may be securely attached to the member to be decorated by fitting said insert over the member to be decorated and then fitting said holder over said insert and thereafter joining said cover to said holder.

2. An ornamental assembly as set forth in claim 1 wherein flanges are extended outwardly from the opposite sides of the upper and lower surfaces of said insert for engagement with the upper and lower surfaces of the holder when assembled.

* * * * *